(12) United States Patent
Winzer et al.

(10) Patent No.: US 8,958,703 B2
(45) Date of Patent: Feb. 17, 2015

(54) MULTIPATH CHANNEL FOR OPTICAL SUBCARRIER MODULATION

(75) Inventors: Peter J. Winzer, Aberdeen, NJ (US); Gerard J. Foschini, Sayreville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 728 days.

(21) Appl. No.: 13/182,513

(22) Filed: Jul. 14, 2011

(65) Prior Publication Data

US 2012/0224863 A1   Sep. 6, 2012

Related U.S. Application Data

(60) Provisional application No. 61/449,246, filed on Mar. 4, 2011.

(51) Int. Cl.
| | | |
|---|---|---|
| H04B 10/12 | (2006.01) | |
| H04B 10/00 | (2013.01) | |
| G02B 6/14 | (2006.01) | |
| H04J 14/04 | (2006.01) | |
| H04B 10/2581 | (2013.01) | |
| H04L 1/00 | (2006.01) | |

(52) U.S. Cl.
CPC . *G02B 6/14* (2013.01); *H04J 14/04* (2013.01); *H04B 10/2581* (2013.01); *H04L 1/004* (2013.01)
USPC ............ 398/158; 398/141; 398/142; 398/147

(58) Field of Classification Search
CPC ..................... H04B 10/2525; H04B 10/25253; H04B 10/2581; H04B 10/5055; H04B 10/5053; H04B 14/002; H04B 14/08; H04Q 2011/0052; H04Q 2011/0054; H04Q 2011/0015; H04Q 2213/016; H04Q 2213/13016; H04J 14/04; H04J 2203/0012; H04J 2203/0003; H04J 2203/0005
USPC ........... 398/44, 45, 48, 79, 82, 142, 143, 192, 398/193, 141, 158, 147
See application file for complete search history.

(56) References Cited

U.S. PATENT DOCUMENTS

| | | | |
|---|---|---|---|
| 4,856,864 A | * | 8/1989 | Campbell et al. ............. 398/200 |
| 5,283,780 A | | 2/1994 | Schuchman et al. |

(Continued)

FOREIGN PATENT DOCUMENTS

| | | |
|---|---|---|
| JP | S5311040 A | 2/1978 |
| JP | S6174965 A | 4/1986 |

(Continued)

OTHER PUBLICATIONS

International Search Report; Mailed Jun. 5, 2012 for corresponding PCT Application No. PCT/US2012/026734.

(Continued)

*Primary Examiner* — Dalzid Singh
(74) *Attorney, Agent, or Firm* — Mendelsohn, Drucker & Dunleavy, P.C.; Yuri Gruzdkov

(57) ABSTRACT

In a representative embodiment, a multipath channel and an optical subcarrier modulation scheme are designed in concert to cause different modulated subcarriers of the optical communication signal to become substantially uncorrelated over the aggregate signal bandwidth. Provided that the employed FEC code has sufficient error-correcting capability for average channel conditions, breakdowns in the operation of the FEC decoder and the corresponding system outages can substantially be avoided.

18 Claims, 5 Drawing Sheets

(56) References Cited

U.S. PATENT DOCUMENTS

| | | | |
|---|---|---|---|
| 5,940,548 | A | 8/1999 | Yamada et al. |
| 6,341,023 | B1 * | 1/2002 | Puc .................................. 398/79 |
| 6,421,478 | B1 | 7/2002 | Paiam |
| 6,853,758 | B2 | 2/2005 | Ridgway et al. |
| 7,051,261 | B1 | 5/2006 | Dhamankar |
| 7,194,156 | B2 | 3/2007 | Deliwala |
| 7,437,082 | B1 * | 10/2008 | Smith ........................... 398/175 |
| 8,676,056 | B2 * | 3/2014 | Gottwald ......................... 398/76 |
| 2003/0021509 | A1 | 1/2003 | Yap et al. |
| 2003/0193889 | A1 * | 10/2003 | Jacobsen ....................... 370/208 |
| 2005/0053324 | A1 | 3/2005 | Ridgway |
| 2005/0226547 | A1 | 10/2005 | Ridgway |
| 2007/0160321 | A1 | 7/2007 | Wu et al. |
| 2007/0195319 | A1 | 8/2007 | Kachanov et al. |
| 2010/0080571 | A1 * | 4/2010 | Akiyama et al. ............... 398/184 |
| 2010/0196005 | A1 | 8/2010 | Wada et al. |
| 2010/0329670 | A1 | 12/2010 | Essiambre et al. |
| 2010/0329671 | A1 | 12/2010 | Essiambre et al. |
| 2010/0329693 | A1 | 12/2010 | Chen |
| 2011/0038631 | A1 | 2/2011 | Doerr |
| 2011/0243490 | A1 | 10/2011 | Ryf |

FOREIGN PATENT DOCUMENTS

| | | |
|---|---|---|
| JP | H09171114 A | 6/1997 |
| JP | 2008530904 A | 8/2008 |
| WO | WO2010107439 A1 | 9/2010 |
| WO | WO2010151432 A1 | 12/2010 |

OTHER PUBLICATIONS

Partial International Search Report; Mailed Jun. 5, 2012 for corresponding PCT Application No. PCT/US2012/026900.

Lee S. C. J, et al.; "10.7 Gbit/s Transmission Over 220 m Polymer Optical fiber Using Maximum Likelihood Sequence Estimation"; Optical Fiber Communication conference and Exposition National Fiber Optic Engineers Conference. OFCNFOEC 2007; Mar. 25-29, 2007; Anaheim, CA, USA; IEEE, Piscataway, NJ, USA; Mar. 1, 2007; pp. 1-3.

Essiambre, René-Jean, et al., "Capacity Limits of Optical Fiber Networks," Journal of Lightwave Technology, vol. 28, No. 4, Feb. 15, 2010, pp. 662-701.

Ryf, R., et al., "Coherent 1200-km 6 ×6 MIMO Mode-Multiplexed Transmission over 3-core Microstructured Fiber," European Conference on Optical Communication (ECOC) Postdeadline Papers, 2011 (3 pages).

International Search Report and Written Opinion; Mailed Mar. 28, 2013 for corresponding PCT Application No. PCT/US2012/026900.

Ryf, Roland, U.S. Appl. No. 12/827,284, filed Jun. 30, 2010.

Ryf, Roland, U.S. Appl. No. 12/986,468, filed Jan. 7, 2010.

Winzer, Peter J., U.S. Appl. No. 13/018,511, filed Feb. 1, 2010.

Gloge, D, "Weakly Guiding Fibers," Applied Optics, vol. 10, No. 10, Oct. 1971, pp. 2252-2258.

* cited by examiner

100

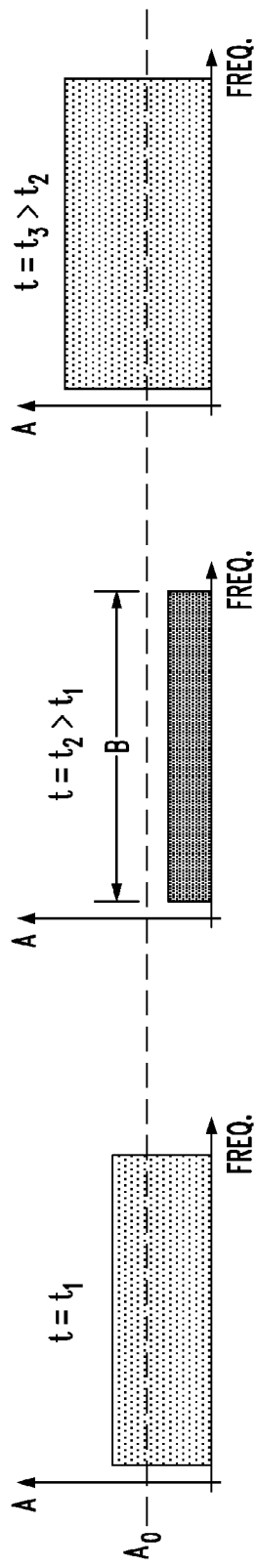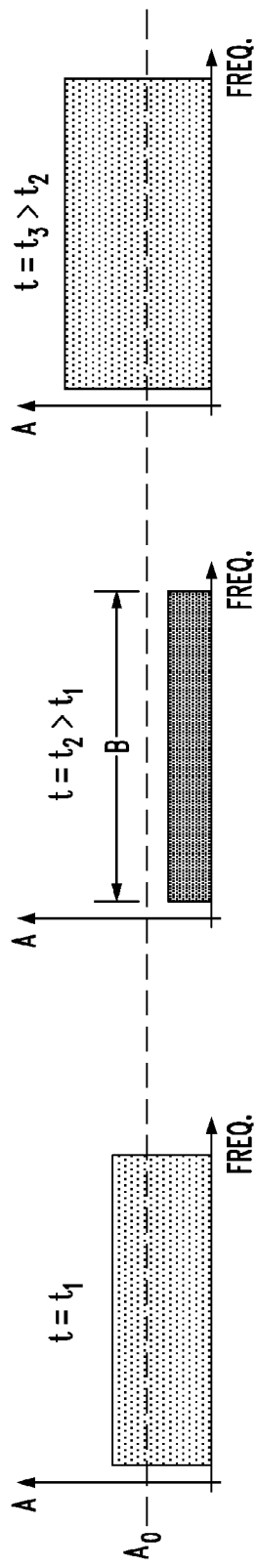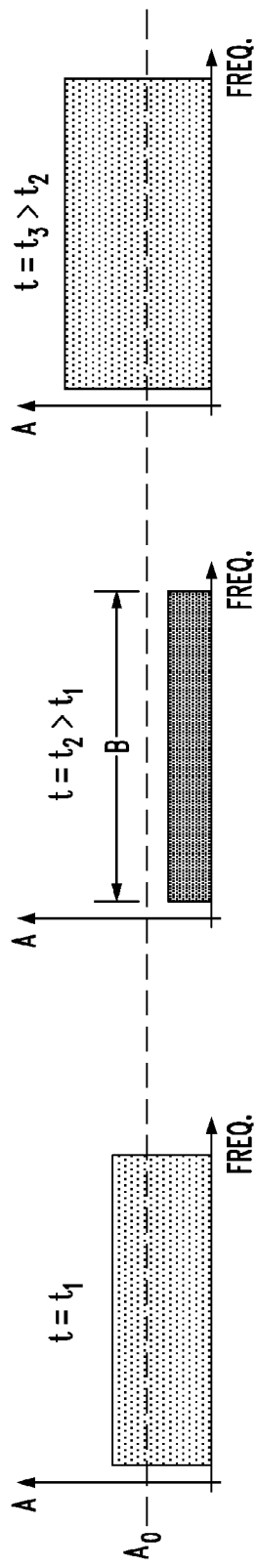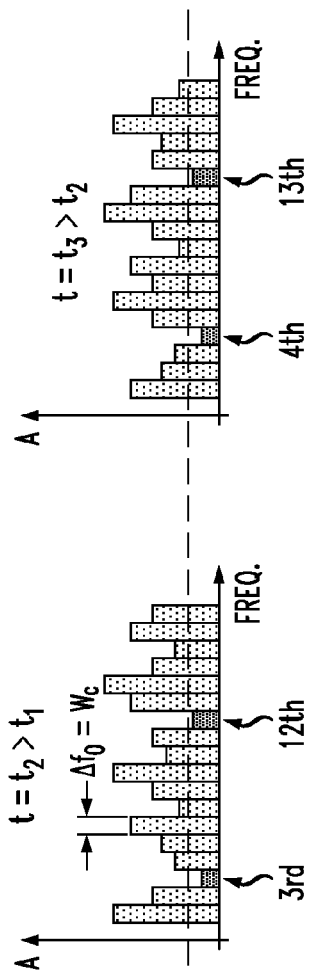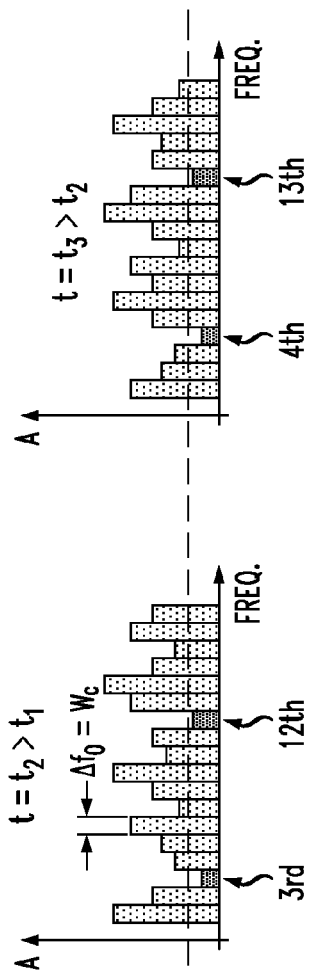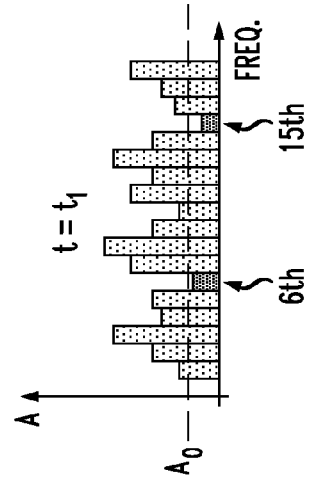

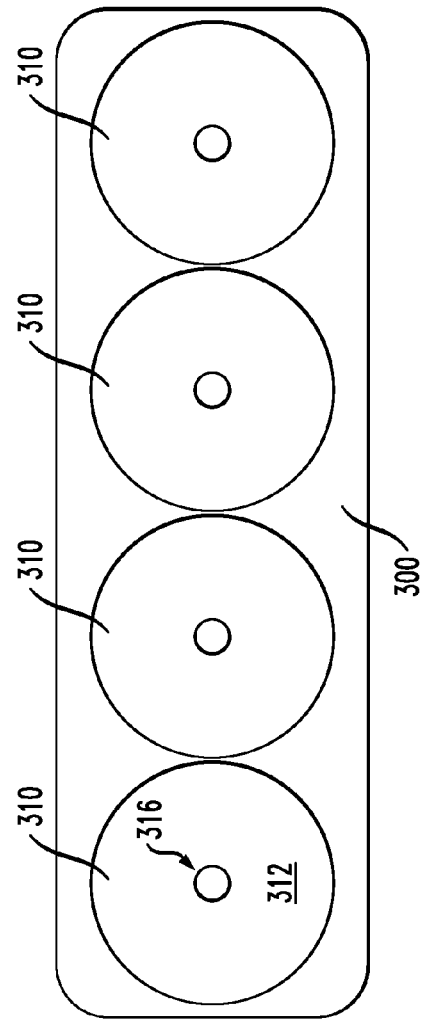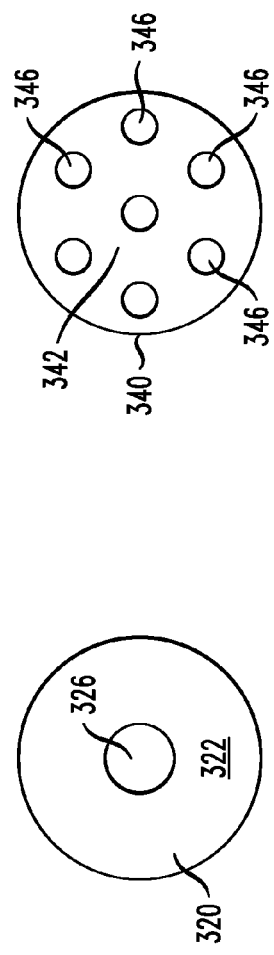

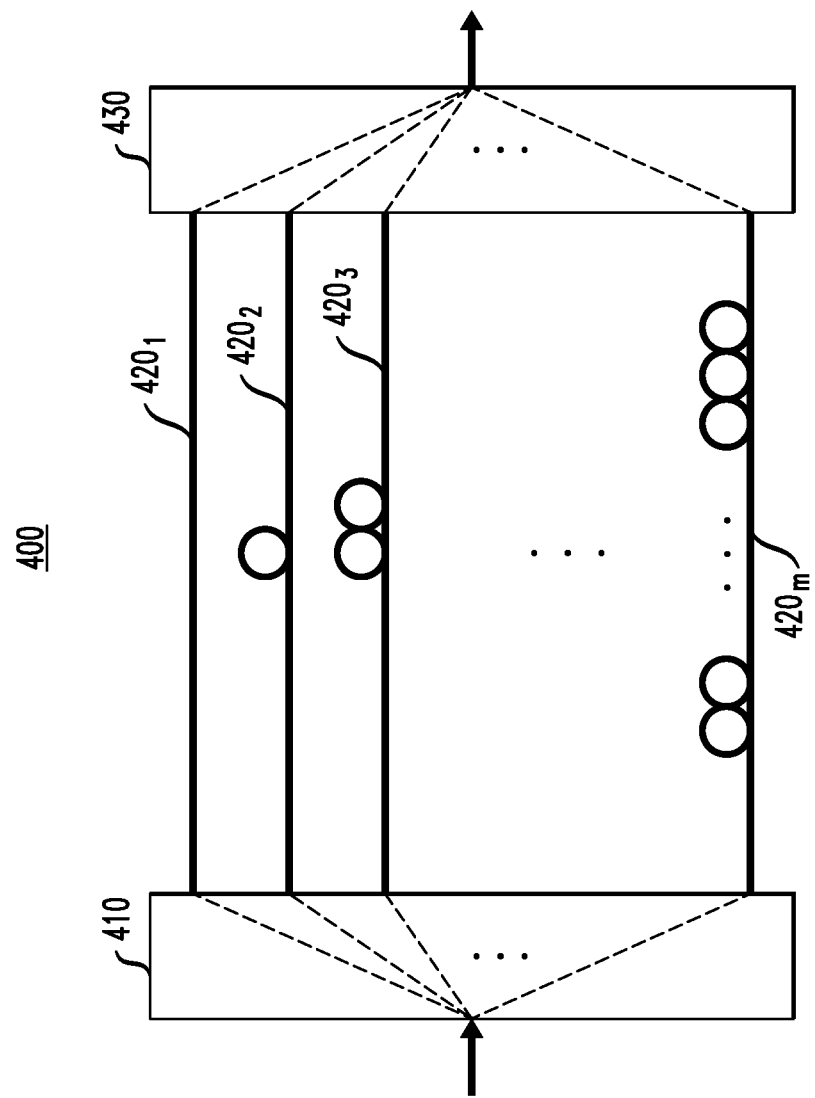

500

520

MULTIPATH CHANNEL FOR OPTICAL SUBCARRIER MODULATION

CROSS-REFERENCE TO RELATED APPLICATIONS

The subject matter of this application is related to that of U.S. Provisional Patent Application No. 61/449,246 filed on Mar. 4, 2011, which is incorporated herein by reference in its entirety.

BACKGROUND

1. Field of the Invention

The present invention relates to optical communication equipment and, more specifically but not exclusively, to multipath channels for optical subcarrier modulation.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Optical MIMO (multiple in, multiple out) methods are being actively developed to exploit the inherently high transmission capacity of multipath (e.g., multimode and/or multi-core) optical fibers. However, one problem with a multipath optical fiber is that it subjects the optical communication signals that are being transmitted therethrough to stochastic amplitude fading. Due to the amplitude fading, the optical communication channel established over a multipath fiber may have instantiations whose maximum MIMO capacities are lower than the minimum MIMO capacity permitted by the FEC (forward error correction) coding implemented in the system. During such channel instantiations, the transmitted optical signal becomes un-decodable at the receiver, which disadvantageously produces a system outage that may persist for an extended period of time, for example, until the MIMO capacity of the channel recovers to a higher level.

SUMMARY

Disclosed herein are various embodiments of a multipath channel for use with an optical subcarrier modulation (SCM) scheme. In a representative embodiment, the optical channel and SCM scheme are designed in concert to cause different modulated subcarriers of the optical communication signal to become substantially uncorrelated over the signal bandwidth. Provided that the employed FEC code has sufficient error-correcting capacity for average channel conditions, breakdowns in the operation of the FEC decoder and the corresponding system outages can substantially be avoided. Various embodiments of the present invention can advantageously be used as means for reducing the probability of system outages in the design, specification, and configuration of optical transport systems operating over multi-core/multi-mode optical fibers or optical fiber cables.

According to one embodiment, provided is an apparatus comprising an optical channel configured to transport, via a plurality of signal-propagation paths, a first modulated optical signal having N modulated subcarriers, wherein a ratio of a bandwidth of the first modulated optical signal to a coherence bandwidth of the optical channel is larger than or about equal to N, where N is a positive integer greater than one.

According to another embodiment, provided is an optical-communication method comprising the step of transporting a modulated optical signal having N modulated subcarriers via a plurality of signal-propagation paths of an optical channel having a coherence bandwidth such that a ratio of a bandwidth of the modulated optical signal to said coherence bandwidth is larger than or about equal to N, where N is a positive integer greater than one.

BRIEF DESCRIPTION OF THE DRAWINGS

Other aspects, features, and benefits of various embodiments of the invention will become more fully apparent, by way of example, from the following detailed description and the accompanying drawings, in which:

FIGS. 2A-2F graphically illustrate representative spectral characteristics of the optical communication channel in the system of FIG. 1 according to one embodiment of the invention;

FIGS. 3A-3C show cross-sectional views of optical fibers that can be used to implement one or more fiber sections in the system of FIG. 1 according to various embodiments of the invention;

FIG. 4 shows a block diagram of a delay-spread element (DSE) that can be used in the system of FIG. 1 according to one embodiment of the invention.

DETAILED DESCRIPTION

Figure 1:
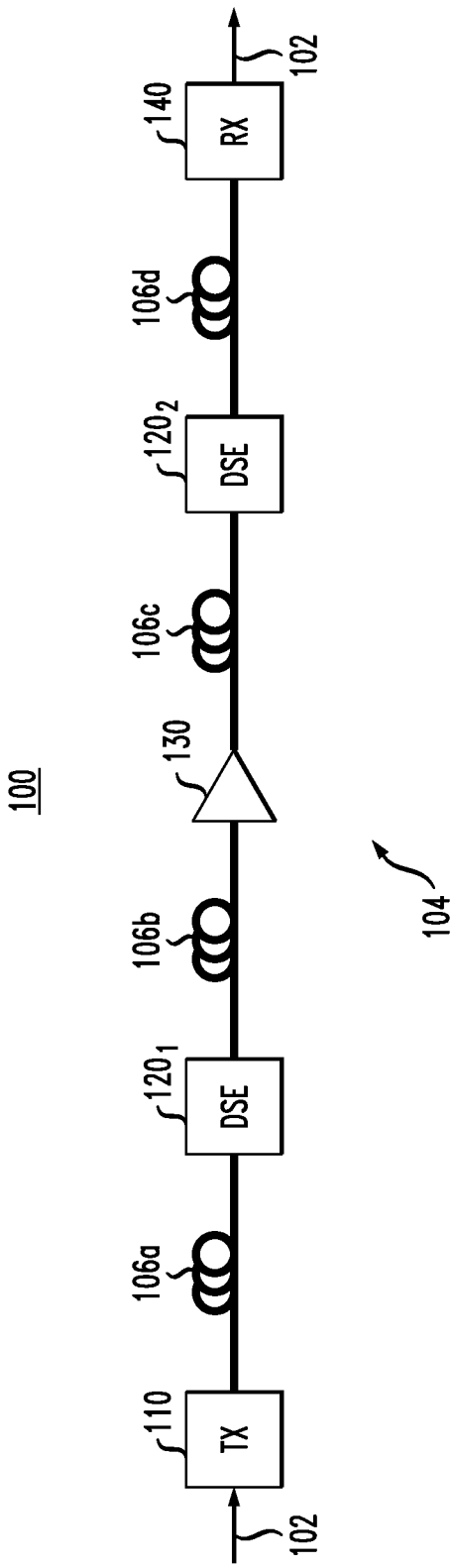
FIG. 1 shows a block diagram of an optical transport system according to one embodiment of the invention.

FIG. 1 shows a block diagram of an optical transport system 100 according to one embodiment of the invention. System 100 has an optical transmitter 110 and an optical receiver 140 connected to one another via an optical communication channel 104. Channel 104 provides a plurality of signal-propagation paths for optical communication signals that are being transported in system 100 from transmitter 110 to receiver 140. As used herein, the term "signal-propagation path" encompasses any physical path that an optical signal can take en route to its destination. Two signal-propagation paths are considered to be different for the same optical wavelength if they occupy different (e.g., essentially orthogonal) spatial dimensions at one or more points between the transmitter and receiver. For example, signal propagation paths may differ from one another in one or more of (i) physical length, (ii) signal-traversal time, and (iii) the spatial path taken through a physical component or element. In particular, two different spatial modes of a multimode fiber constitute two different propagation paths because they occupy essentially orthogonal spatial dimensions, typically with different signal-traversal times. Two different cores of a multi-core optical fiber or fiber cable constitute two different propagation paths because they occupy essentially orthogonal spatial dimensions by guiding optical signals via different respective fiber cores.

Channel 104 is illustratively shown in FIG. 1 as having the following components: four sections 106a-106d of a multipath optical fiber, two delay-spread elements (DSEs) $120_1$-$120_2$, and an optical amplifier 130. In alternative embodiments, channel 104 may have a different number of fiber sections 106, a different number of DSEs 120, and/or a different number of optical amplifiers 130. Some of the shown components of channel 104 may be omitted, and/or some additional components that differ from those shown in FIG. 1 (such as optical routing elements, variable optical attenuators, optical splitters, optical filters, and the like) may be incorporated into the channel, as will be apparent to one of ordinary skill in the art from the description provided herein.

Transmitter 110 is configured to receive an input data stream 102 and generate a corresponding optical output signal that is applied to fiber section 106a to carry the data of the input data stream, via channel 104, to receiver 140. Transmitter 110 generates the optical output signal using forward-error-correction (FEC) coding and a suitable subcarrier modulation (SCM) scheme. In one embodiment, the SCM scheme implemented in system 100 can be a variant of orthogonal frequency-division multiplexing (OFDM). In another embodiment, the SCM scheme can be a variant of frequency-locked or free-running wavelength-division multiplexing (WDM). In yet another embodiment, the SCM scheme may include correlation between different subcarriers, such as that obtained through offset quadrature-amplitude-modulation techniques. In various alternative embodiments, other suitable SCM schemes can similarly be used.

Transmitter 110 applies FEC coding to the data of input data stream 102 to generate a corresponding FEC-coded data stream (not explicitly shown in FIG. 1). This FEC-coded data stream is partitioned into sub-streams, each of which is used to modulate a corresponding subcarrier of the optical output signal. The FEC coding and partitioning are performed to distribute redundant data over different SCM components (modulated subcarriers) of the optical output signal in a manner that enables receiver 140 to fully recover the data of data stream 102. A representative turbo encoder that can be used to implement such FEC coding and partitioning is disclosed, e.g., in U.S. Pat. No. 7,051,261, which is incorporated herein by reference in its entirety.

Frequencies of the optical output signal generated by transmitter 110 that are located within a coherence bandwidth of one another tend to all fade in a similar or correlated fashion. As used herein, the term "coherence bandwidth" refers to a statistical measure of the range of frequencies over which the channel can be considered "flat," or an approximate maximum bandwidth or frequency interval over which two frequencies of a signal are likely to experience comparable or correlated amplitude fading. For example, if the multipath propagation-delay spread in channel 104 is D seconds, then its coherence bandwith $W_c$ in radian per second can be approximated by Eq. (1):

$$W_c = \frac{2\pi}{D} \quad (1)$$

FIGS. 2A-2F graphically illustrate representative spectral characteristics of channel 104 according to one embodiment of the invention. More specifically, FIGS. 2D-2F graphically show amplitude fading in channel 104 over the aggregate bandwidth (B) of the corresponding optical SCM signal, as viewed at receiver 140. FIGS. 2A-2C similarly graphically show, for comparison with FIGS. 2D-2F, the amplitude fading in a representative channel that is "flat" over bandwidth B (e.g., when $W_c \geq B$). The abscissa in each of FIGS. 2A-2D represents frequency, and the ordinate represents the signal quality, e.g. as measured by the signal-to-noise ratio (SNR) at a particular frequency or by the individually decoded bit-error rate (BER) for a particular subcarrier. The dashed line represents the minimum signal quality, $A_0$, at which an SCM component is still individually decodable at receiver 140. In other words, an individual SCM component becomes un-decodable when its quality is below $A_0$. Each of FIGS. 2A and 2D illustrates the state of the corresponding channel at time $t=t_1$. Each of FIGS. 2B and 2D illustrates the state of the corresponding channel at time $t=t_2>t_1$. Each of FIGS. 2C and 2E illustrates the state of the corresponding channel at time $t=t_3>t_2$.

In the timeline represented by FIGS. 2A-2C, a system outage occurs at time $t=t_2$ (FIG. 2B) because the amplitude fading has rendered all SCM components of the corresponding optical SCM signal un-decodable (all frequency bins within bandwidth B are below $A_0$), thereby causing a breakdown of the FEC decoder. In contrast, in the timeline represented by FIGS. 2D-2F, at most two of the SCM components of the corresponding optical SCM signal are un-decodable at any given time. More specifically, at time $t_1$ (FIG. 2D), only the sixth and fifteenth SCM components have the signal quality that is lower than $A_0$. At time $t_2$ (FIG. 2E), only the third and twelfth SCM components have the signal quality that is lower than $A_0$. At time $t_3$ (FIG. 2E), only the fourth and thirteenth SCM components have the signal quality that is lower than $A_0$. Provided that the FEC code implemented in system 100 has the error-correcting capacity that is higher than that corresponding to two un-decodable SCM components, receiver 140 operates so as to avoid outage and there-by fully recover the data of data stream 102 without interruptions. A channel having characteristics that are qualitatively similar to those shown in FIGS. 2D-2F is referred to as a frequency-selective channel.

The configuration of system 100 with representative spectral characteristics illustrated by FIGS. 2D-2F is able to handle the adverse effects of amplitude fading in channel 104 substantially without system outages due to a properly chosen relationship between bandwidth B, coherence bandwidth $W_c$, number N of the SCM components, and the error-correcting capacity of the FEC code (e.g., as represented by the code's breakdown threshold n), which can convert substantially any optical channel into a frequency-selective one. More specifically, the general approach is to design and configure system 100 so that the optical SCM signal tends to experience instantaneous channel conditions that are not far removed from average channel conditions as illustrated in FIGS. 2D-2F, as opposed to seeing widely fluctuating instantaneous channel conditions as illustrated in FIGS. 2A-2C. Provided that the FEC code has sufficient error-correcting capacity to enable full data recovery at about average channel conditions, the probability of system outages can advantageously be reduced to a relatively low level.

In reference to system 100 (FIG. 1), the qualitative picture graphically shown in FIGS. 2A-2F can be quantified as follows. Let us assume that the optical output signal generated by transmitter 110 has N SCM components, and the FEC code used in system 100 enables receiver 140 to fully recover the data of data stream 102 when up to n<N of the SCM components are individually un-decodable, with the decoder breaking down when the number of individually un-decodable SCM components exceeds n. Then, a system outage will occur whenever at least n subcarriers simultaneously experience bad individual channel-transmission performance. A prior-art optical transport system is usually engineered to have a certain built-in outage probability that is low but non-negligible. In contrast, in system 100, if N is chosen wisely, e.g., so that at most n subcarriers can simultaneously fade, the outage probability can be a controllable parameter that can advantageously be reduced to a much lower level than the built-in outage probability of the prior-art system. In the (theoretical) limit of an infinite number of uncorrelated subcarriers, the outage probability can be factored into the pre-FEC bit-error probability, thereby resulting in a zero outage probability. This is also known as "MIMO capacity hardening." In practice, the respective designs of channel 104, SCM scheme, and FEC code can be considered together and handled in concert so as to bring the outage probability down to any desired level.

In one embodiment, the above-outlined general approach can be implemented in system 100 through (i) the use of an appropriately selected SCM scheme, which controls the values of N and $\Delta f_0$, where $\Delta f_0$ is the bandwidth corresponding to one SCM component (also see FIG. 2E), (ii) the use of an appropriately selected FEC code, which controls the value of n, and (iii) appropriate engineering and configuration of the various components of channel 104, which controls the value of coherence bandwidth $W_c$.

The following considerations are helpful for proper implementation of the above-outlined general approach:

(a) Design and/or configure channel 104 to have coherence bandwith $W_c$ such that the approximate number (K) of statistically independent frequency bins per aggregate signal bandwidth B is relatively large, e.g., as expressed by Eq. (2):

$$K \approx \frac{B}{W_c} > K_0 \qquad (2)$$

where $K_0$ is a threshold value. In a representative embodiment, $K_0$ can be about five or ten. In general, $K_0$ is selected to be large enough so that the number (k) of frequency bins having a signal quality that is below $A_0$ does not fluctuate much over time. For example, in FIGS. 2D-2F, K=18 and k≈2. Note that a "frequency bin" is not the same thing as an SCM component. More specifically, the number of frequency bins over signal bandwidth B characterizes the degree of "flatness" that the channel has for the signal transmission. In contrast, the number of SCM components is a characteristic of the signal that can be chosen (as is typically done in the prior art) without giving any consideration to the coherence bandwidth of the channel.

(b) Select an SCM scheme and an FEC code so that, at about average channel conditions, the FEC code has sufficient error-correcting capability to enable full data recovery at receiver 140. For example, for the configuration illustrated in FIGS. 2D-2F, these specifications are implemented as N=K=18 and n>k=2. In various alternative embodiments, the values of N and K do not need to be the same, provided that the following caveats are taken into account. When N=K, all of the N SCM components are substantially uncorrelated, and each SCM component sees a corresponding substantially flat sub-channel that can be equalized at the receiver using an equalizer with a relatively short impulse response. When N>K, each of the corresponding sub-channels becomes even flatter across the bandwidth of the SCM component, but the SCM components are no longer fully statistically independent of one another. This fact has implications for the selection of the FEC code. When N<K, each sub-channel is no longer flat, and an equalizer with a longer impulse response needs to be used at the receiver.

Note that the above-outlined approach can be realized starting from either (a) or (b). For example, a system designer may start out by selecting a suitable SCM scheme with a practical N value for system 100 and then complete the design process by realizing an embodiment of channel 104 with an advantageous coherence bandwidth. Alternatively, the system designer may start out by designing channel 104 first and then selecting an advantageous SCM scheme to go with it in system 100.

In general, any one of the individual components of channel 104 affects the channel's coherence bandwidth W. In a representative embodiment, different individual components of channel 104 are connected to one another to contribute additively to the total multipath propagation-delay spread, which affects the channel coherence bandwidth in accordance with Eq. (1). Based on the description provided herein, one of ordinary skill in the art will understand how to use various individual channel components to arrive at an embodiment of channel 104 having any desired coherence bandwidth.

FIGS. 3A-3C show (not to scale) cross-sectional views of optical fibers or fiber cables that can be used to implement any one of fiber sections 106 (FIG. 1) according to various embodiments of the invention.

FIG. 3A shows a cross-sectional view of a fiber ribbon 300 having four single-mode or multimode fibers 310. Each fiber 310 has a respective cladding 312 and a core 316. In a representative embodiment, core 316 has a relatively small diameter, and the refractive-index difference between core 316 and cladding 312 is relatively small, which causes fiber 310 to support either a single guided mode or only a small number (e.g., fewer than ten) guided modes for any frequency (wavelength) of the optical SCM signal.

In an alternative embodiment, fiber ribbon 300 can be implemented using any desired number of fibers 310. Fibers 310 can be spatially arranged to form a fiber cable having a sheath that encloses multiple fiber strands or a relatively loose bundle of separate, individual fibers.

When each of fibers 310 is a single-mode fiber, the multipath propagation-delay spread imposed by fiber ribbon 300 is determined by differences in the lengths and/or propagation constants between different individual fibers 310. It is known in the art that the propagation constant of a fiber depends on the diameter of the core and the refraction indices of the core and cladding. Therefore, in a representative embodiment, a desired propagation-delay spread can be obtained even if all fibers 310 have the same length, e.g., by using individual fibers that have different propagation constants.

When each of fibers 310 is a multimode fiber, the multipath propagation-delay spread imposed by fiber ribbon 300 is also affected by the group delays of the modes within an individual fiber 310.

FIG. 3B shows a cross-sectional view of a multimode fiber 320. Fiber 320 has a cladding 322 and a core 326. Fiber 320 differs from fiber 310 in that core 326 has a larger diameter than core 316, which generally causes fiber 320 to support more guided modes than fiber 310. The propagation-delay spread imposed by multimode fiber 320 is primarily determined by the group delay of the modes carried within the fiber.

FIG. 3C shows a cross-sectional view of a multi-core fiber 340. Fiber 340 has a cladding 342 and a plurality of cores 346 enclosed within the cladding. The diameter of each core 346 and the refractive indices of the cores and cladding 342 can be chosen to cause each core to support either a single guided mode or multiple guided modes. In various embodiments, different cores 346 may have different diameters or the same diameter and be made of materials having different refractive indices or of the same refractive index. The multipath propagation-delay spread imposed by multi-core fiber 340 is determined by (i) differences in the propagation constants between different cores 346 and/or (ii) the group delays of different individual multimode cores.

As used herein, the term "multipath fiber" encompasses fiber arrangements (such as fiber ribbon 300 of FIG. 3A, fiber cables, and fiber bundles), multimode fibers (such as multimode fiber 320 of FIG. 3B), and multi-core fibers (such as multi-core fiber 340 of FIG. 3C).

FIG. 4 shows a block diagram of a delay-spread element (DSE) 400 that can be used as DSE 120 according to one embodiment of the invention. DSE 400 has a plurality of delay lines $420_1$-$420_m$ coupled between a one-to-m optical splitter 410 and an m-to-one optical combiner 430. In one embodiment, the insertion delay ($d_i$) of delay line $420_i$ is described by Eq. (3):

$$d_i = d_1 + d_0(i-1) \qquad (3)$$

where i=1, 2, . . . m; $d_0$ is the delay increment between adjacent delay lines; and $d_1$ is the insertion delay of delay line $420_1$. The multipath propagation-delay spread (D) corresponding to Eq. (3) is D=(m−1)$d_0$. In an alternative embodiment, a different insertion-delay assignment to various delay lines 420 can similarly be used. Delay lines 420 can be implemented, e.g., using single-mode or multimode fibers.

In one embodiment, splitter 410 is a conventional optical-power splitter, and combiner 430 is a conventional optical-power combiner. In another embodiment, splitter 410 is a spatial-mode splitter, and combiner 430 is a spatial-mode combiner, both intended for being coupled to external multimode fibers, e.g., as described in U.S. Patent Application Publication No. 2010/0329671 (see, e.g., FIGS. 3-6 therein), which is incorporated herein by reference in its entirety.

In general, two separate instances of the same physical device can be used to implement splitter 410 and combiner 430, with the difference between these instances being the direction in which optical signals traverse the device. More specifically, the splitter functionality is obtained when optical signals traverse the device from the single-port side to the multi-port side. The combiner functionality is obtained when optical signals traverse the device from the multi-port side to the single-port side. For example, either a spatial-mode splitter 410 or a spatial-mode combiner 430 can be implemented using an optical mode coupler designed to optically couple m single-mode fibers and a single multimode fiber so that different spatial modes of the multimode fiber are optically coupled to different respective single-mode fibers with relatively high selectivity (low cross-coupling efficiency).

Figure 5A:
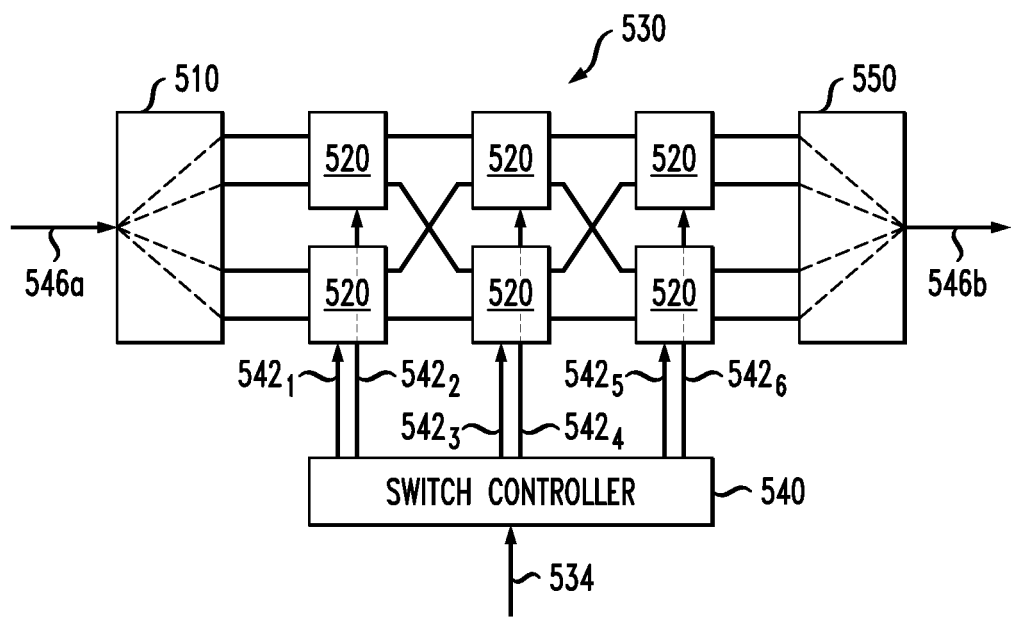
FIGS. 5A-5B show block-diagrams of a DSE that can be used in the system of FIG. 1 according to another embodiment of the invention.
Figure 5B:
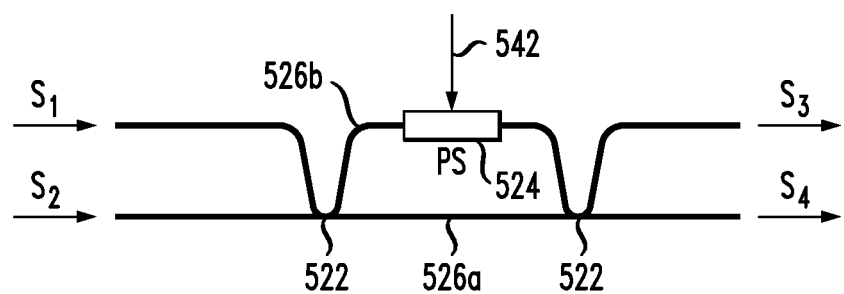

FIGS. 5A-5B show block-diagrams of a delay-spread element (DSE) 500 that can be used as DSE 120 according to another embodiment of the invention. More specifically, FIG. 5A shows an overall block diagram of DSE 500. FIG. 5B shows a block diagram of a 2×2 optical switch 520, a plurality of which are used in DSE 500.

Referring to FIG. 5A, DSE 500 is coupled between two multipath fibers 546a-b. For example, in a representative configuration, multipath fiber 546a can be a part of fiber section 106a, and multipath fiber 546b can be a part of fiber section 106b (see FIG. 1). DSE 500 comprises an optical splitter 510, an optical combiner 550, and an interconnected array 530 of 2×2 switches 520. Although array 530 is illustratively shown as having six switches 520, other array sizes can similarly be used. In one embodiment, splitter 510 is analogous to splitter 410 (FIG. 4), and combiner 550 is analogous to combiner 430 (FIG. 4).

The state of each switch 520 is controlled by a corresponding one of control signals $542_1$-$542_6$ that is applied to the switch by a switch controller 540. Switch controller 540 may be configured to generate control signals $542_1$-$542_6$ based on an external control signal 534, which controls the value of the multipath propagation-delay spread imposed by array 530. Once a desired value of the multipath propagation-delay spread is chosen and DSE 500 is deployed in system 100 (FIG. 1), controller 540 can be configured to keep array 530 in a static state, i.e., the state of switches 520 is not being changed while optical SCM signals are being routed through DSE 500.

Referring to FIG. 5B, switch 520 comprises an unbalanced Mach-Zehnder interferometer having a relatively short arm 526a and a relatively long arm 526b, with both arms coupled between two (e.g., 3-dB) optical couplers 522. Arm 526b includes a phase shifter (PS) 524 that receives a corresponding control signal 542 from controller 540. Each of output signals $S_3$ and $S_4$ produced by switch 520 represents a linear combination of input signals $S_1$ and $S_2$ applied to the switch, with the coefficients of the linear combination depending on (i) the wavelength of signals $S_1$ and $S_2$, (ii) the length difference between arms 526a and 526b, and (iii) the value of the phase shift imposed by phase shifter 524. For the propagation-delay difference between arms 526a and 526b of ΔL [seconds], the frequency selectivity of individual switch 520 is about 1/ΔL [Hertz].

Referring back to FIG. 5A, due to the above-described properties of individual switches 520, array 530 imposes a multipath propagation-delay spread that depends on the number of switches 520 in the array and the topology of interconnections between the switches. Therefore, in general, any desired multipath propagation-delay spread can be obtained by properly choosing the parameters of individual switches and the size and topology of the array. One benefit of having tunable phase shifters 524 and controller 540 is that the same embodiment of DSE 500 can be used to obtain different propagation-delay spreads in different optical channels.

In one embodiment, controller 540 and phase shifters 524 can be omitted.

Referring now back to FIG. 1, in one embodiment, system 100 can be used to transport a plurality of different optical SCM signals using space-division multiplexing (SDM). More specifically, according to an SDM scheme, different optical SCM signals are coupled at transmitter 110 into different respective spatial modes of the multipath fiber of section 106a for transmission to receiver 140. At receiver 140, the optical SCM signals carried by different spatial modes of the multipath fiber of section 106d are separated from one another and demodulated/decoded to recover the data encoded onto the original optical SCM signals at transmitter 110. Representative SDM transmitters and SDM receivers that can be used for these purposes in system 100 to implement transmitter 110 and receiver 140 are disclosed, e.g., in the above-cited U.S. Patent Application Publication No. 2010/0329671 (see, e.g., FIGS. 8-12 therein).

While this invention has been described with reference to illustrative embodiments, this description is not intended to be construed in a limiting sense.

One of ordinary skill in the art will understand that, in general, any component of the optical channel can be used to change the channel's coherence bandwidth as appropriate or necessary, e.g., using the relationship between the coherence bandwidth and propagation-delay spread provided by Eq. (1). For example, in addition to or instead of fiber section(s) 106 and DSE(s) 120, amplifier 130 can be used to change the propagation-delay spread and, hence, the coherence bandwidth of channel 104 (see FIG. 1).

Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

What is claimed is:

1. An apparatus, comprising an optical channel configured to transport, via a plurality of signal-propagation paths, a first modulated optical signal having N modulated subcarriers, wherein a ratio of a bandwidth of the first modulated optical signal to a coherence bandwidth of the optical channel is larger than or about equal to N, where N is a positive integer greater than one, wherein:
   the optical channel comprises a multimode optical fiber; and
   a group delay in the multimode optical fiber determines the coherence bandwidth.

2. The apparatus of claim 1, further comprising an optical transmitter connected to the optical channel and configured to:
   apply an FEC code to an input data stream to generate an FEC-coded data stream;
   partition the FEC-coded data stream into a plurality of sub-streams; and
   generate each of the modulated subcarriers based on a corresponding one of the sub-streams.

3. The apparatus of claim 2, wherein:
   the optical transmitter is configured to perform said FEC-coding and said partitioning in a manner that enables full data recovery of the input data stream from the modulated optical signal when up to n of the modulated subcarriers are rendered individually un-decodable, where n<N; and
   the optical channel is characterized by transmission impediments that are capable of rendering fewer than n or exactly n modulated subcarriers of the modulated optical signal individually un-decodable.

4. The apparatus of claim 1, wherein the optical channel comprises a delay-spread element connected between first and second optical fibers or optical fiber cables, the delay-spread element having a plurality of internal optical paths and configured to direct the first modulated optical signal from the first optical fiber or optical fiber cable, via said plurality of internal optical paths, to the second optical fiber or optical fiber cable.

5. The apparatus of claim 1, further comprising an optical transmitter connected to the optical channel, wherein:
   the optical transmitter is configured to couple the first modulated optical signal into a first spatial mode of the multi-core optical fiber or optical fiber cable at a proximate end thereof; and
   the optical transmitter is further configured to couple a second modulated optical signal having N modulated subcarriers into a second spatial mode of the multi-core optical fiber or optical fiber cable at said proximate end, said second spatial mode being different from the first spatial mode.

6. An optical-communication method, comprising:
   transporting a modulated optical signal having N modulated subcarriers via a plurality of signal-propagation paths of an optical channel having a coherence bandwidth such that a ratio of a bandwidth of the modulated optical signal to said coherence bandwidth is larger than or about equal to N, where N is a positive integer greater than one;
   FEC-coding an input data stream to generate an FEC-coded data stream;
   partitioning the FEC-coded data stream into a plurality of sub-streams; and
   generating each of the modulated subcarriers based on a corresponding one of the sub-streams, wherein:

transmission impediments in the optical channel are capable of rendering fewer than n or exactly n modulated subcarriers of the modulated optical signal individually un-decodable, where n<N; and said FEC-coding and said partitioning are performed in a manner that enables full data recovery of the input data stream from the modulated optical signal when up to n of the modulated subcarriers are rendered individually un-decodable.

7. The method of claim 6, wherein N>5.

8. The method of claim 6, wherein:

the optical channel comprises a delay-spread element connected between first and second optical fibers or optical fiber cables, the delay-spread element having a plurality of internal optical paths; and the method further comprises directing the modulated optical signal from the first optical fiber or optical fiber cable, via said internal optical paths, to the second optical fiber or optical fiber cable.

9. The method of claim 8, wherein the delay-spread element comprises:

an optical splitter connected to the first optical fiber or optical fiber cable;

an optical combiner connected to the second optical fiber or optical fiber cable; and an array of Mach-Zehnder interferometers coupled between the optical splitter and the optical combiner and configured to provide said plurality of propagation paths, wherein:

at least one of said Mach-Zehnder interferometers includes a tunable phase shifter; and the method further comprises configuring the tunable phase shifter to impose a fixed phase shift while the modulated optical signal is being routed through the delay spread element.

10. An apparatus, comprising an optical channel configured to transport, via a plurality of signal-propagation paths, a first modulated optical signal having N modulated subcarriers, wherein a ratio of a bandwidth of the first modulated optical signal to a coherence bandwidth of the optical channel is larger than or about equal to N, where N is a positive integer greater than one, wherein:

the optical channel comprises a multi-core optical fiber or optical fiber cable; and a propagation-delay spread of the multi-core optical fiber or optical fiber cable determines the coherence bandwidth.

11. An apparatus, comprising an optical channel configured to transport, via a plurality of signal-propagation paths, a first modulated optical signal having N modulated subcarriers, wherein a ratio of a bandwidth of the first modulated optical signal to a coherence bandwidth of the optical channel is larger than or about equal to N, where N is a positive integer greater than one, wherein the optical channel comprises a delay-spread element connected between first and second optical fibers or optical fiber cables, the delay-spread element having a plurality of internal optical paths and configured to direct the first modulated optical signal from the first optical fiber or optical fiber cable, via said plurality of internal optical paths, to the second optical fiber or optical fiber cable.

12. The apparatus of claim 11, wherein a propagation-delay spread of the internal optical paths determines the coherence bandwidth.

13. The apparatus of claim 11, wherein the delay-spread element comprises:

an optical splitter connected to the first optical fiber or optical fiber cable;

an optical combiner connected to the second optical fiber or optical fiber cable; and a plurality of delay lines, each coupled between the optical splitter and the optical combiner and configured to provide a corresponding internal optical path for the first modulated optical signal, wherein at least two of said delay lines have different signal-propagation delays.

14. The apparatus of claim 13, wherein each of the optical splitter and the optical combiner comprises a corresponding optical mode coupler configured to optically couple a plurality of single-mode optical fibers and a multimode fiber so that different spatial modes of the multimode fiber are optically coupled to different respective single-mode fibers.

15. The apparatus of claim 11, wherein the delay-spread element comprises:

an optical splitter connected to the first optical fiber or optical fiber cable;

an optical combiner connected to the second optical fiber or optical fiber cable; and an array of Mach-Zehnder interferometers coupled between the optical splitter and the optical combiner and configured to provide said plurality of propagation paths.

16. The apparatus of claim 15, wherein at least one of said Mach-Zehnder interferometers has arms that differ in length from one another.

17. The apparatus of claim 15, wherein at least one of said Mach-Zehnder interferometers includes a tunable phase shifter.

18. The apparatus of claim 17, wherein the delay-spread element comprises a controller configured to change a phase shift imposed by the tunable phase shifter.

* * * * *